US010030591B2

(12) United States Patent
Klotzek

(10) Patent No.: US 10,030,591 B2
(45) Date of Patent: Jul. 24, 2018

(54) OPERATING AN INTERNAL COMBUSTION ENGINE COUPLED TO A GENERATOR

(71) Applicant: SIEMENS AKTIENGESELLSCHAFT, München (DE)

(72) Inventor: Andreas Klotzek, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 15 days.

(21) Appl. No.: 15/120,360

(22) PCT Filed: Jan. 21, 2015

(86) PCT No.: PCT/EP2015/051136
§ 371 (c)(1),
(2) Date: Aug. 19, 2016

(87) PCT Pub. No.: WO2015/128121
PCT Pub. Date: Sep. 3, 2015

(65) Prior Publication Data
US 2017/0254275 A1 Sep. 7, 2017

(30) Foreign Application Priority Data
Feb. 27, 2014 (EP) .................................... 14156990

(51) Int. Cl.
*F02D 29/00* (2006.01)
*F02D 35/00* (2006.01)
(Continued)

(52) U.S. Cl.
CPC ............ *F02D 29/06* (2013.01); *F02B 63/042* (2013.01); *F02D 35/024* (2013.01); *F02D 41/021* (2013.01); *F02D 41/14* (2013.01)

(58) Field of Classification Search
CPC ...... F02D 29/06; F02D 35/024; F02D 41/021; F02D 41/14; F02B 63/042
See application file for complete search history.

(56) References Cited

U.S. PATENT DOCUMENTS 4,357,662 A * 11/1982 Schira ................ F02D 41/1498 123/406.24
4,977,508 A * 12/1990 Tanaka .................. F02B 75/06 123/192.1
(Continued)

FOREIGN PATENT DOCUMENTS

DE 19532135 A1 3/1997
DE 10253004 A1 5/2004
(Continued)

OTHER PUBLICATIONS

European Search Report for related European Application No. 14156990.5 dated Jul. 21, 2014, with English Translation.
(Continued)

*Primary Examiner* — Thomas Moulis
(74) *Attorney, Agent, or Firm* — Lempia Summerfield Katz LLC

(57) ABSTRACT

The embodiments relate to a method and to a device for operating a system including a generator and an internal combustion engine driving the generator, wherein a rotational speed of the generator is controlled by a rotational speed controller. In the method, the rotational speed controller outputs a target torque as manipulated variable, and an additional torque is imposed on the target torque, wherein the additional torque is calculated or is determined based on a measured value picked up from the system.

7 Claims, 4 Drawing Sheets

(51) Int. Cl.

| | |
|---|---|
| ***F02D 29/06*** | (2006.01) |
| ***F02B 63/04*** | (2006.01) |
| ***F02D 35/02*** | (2006.01) |
| ***F02D 41/02*** | (2006.01) |
| ***F02D 41/14*** | (2006.01) |

(56) References Cited

U.S. PATENT DOCUMENTS

| | | | | |
|---|---|---|---|---|
| 5,056,487 | A * | 10/1991 | Yamakado | F02B 75/06 123/192.2 |
| 5,265,575 | A * | 11/1993 | Norota | F02D 35/023 123/436 |
| 5,537,967 | A * | 7/1996 | Tashiro | B60K 6/485 123/192.1 |
| 5,553,514 | A * | 9/1996 | Walkowc | F16F 9/535 74/574.2 |
| 5,928,301 | A * | 7/1999 | Soga | B60K 6/365 477/31 |
| 6,085,723 | A | 7/2000 | Pels et al. | |
| 6,102,144 | A * | 8/2000 | Lutz | B60K 6/48 180/65.25 |
| 6,161,068 | A * | 12/2000 | Kurishige | B62D 5/0463 180/400 |
| 6,202,776 | B1 | 3/2001 | Masberg et al. | |
| 6,364,807 | B1 * | 4/2002 | Koneda | B60K 6/48 180/65.25 |
| 6,487,998 | B1 | 12/2002 | Masberg et al. | |
| 6,543,588 | B1 * | 4/2003 | Raad | B60L 7/00 180/65.22 |
| 6,585,066 | B1 * | 7/2003 | Koneda | B60K 6/365 180/165 |
| 6,714,852 | B1 | 3/2004 | Lorenz et al. | |
| 7,154,236 | B1 * | 12/2006 | Heap | B60K 6/365 180/65.235 |
| 7,182,065 | B2 * | 2/2007 | Andersen | B60K 6/365 123/352 |
| 7,565,938 | B2 * | 7/2009 | Hisada | B60K 6/445 180/65.1 |
| 7,633,257 | B2 * | 12/2009 | Sakamoto | B60W 30/20 318/611 |
| 7,869,912 | B2 * | 1/2011 | Kishimoto | B60K 6/48 123/434 |
| 8,849,460 | B2 * | 9/2014 | Ye | B60W 10/08 700/275 |
| 9,533,672 | B2 * | 1/2017 | Christ | B60W 10/08 |
| 9,617,934 | B2 * | 4/2017 | Remele | F02D 41/0085 |
| 9,638,115 | B2 * | 5/2017 | Nishimoto | F02D 31/001 |
| 2001/0034572 | A1 * | 10/2001 | Yamaguchi | B60K 6/365 701/22 |
| 2003/0216853 | A1 * | 11/2003 | Jacobson | F02D 35/023 701/106 |
| 2004/0084002 | A1 * | 5/2004 | Mitsutani | F02D 41/021 123/179.4 |
| 2004/0255904 | A1 * | 12/2004 | Izawa | B60K 6/445 123/352 |
| 2006/0173590 | A1 * | 8/2006 | Zillmer | B60K 6/48 701/22 |
| 2006/0293829 | A1 | 12/2006 | Cornwell et al. | |
| 2007/0101965 | A1 * | 5/2007 | Asahara | B60K 6/442 123/192.1 |
| 2008/0223341 | A1 * | 9/2008 | Kamada | F02B 75/048 123/48 B |
| 2008/0236913 | A1 * | 10/2008 | Ichimoto | B60K 6/365 180/65.265 |
| 2009/0194067 | A1 | 8/2009 | Peotter et al. | |
| 2010/0116250 | A1 * | 5/2010 | Simon, Jr. | B60L 3/0023 123/436 |
| 2012/0078456 | A1 * | 3/2012 | Hakumura | B60L 3/003 701/22 |
| 2013/0211694 | A1 * | 8/2013 | Taglialatela | F02P 5/1502 701/105 |
| 2015/0088355 | A1 * | 3/2015 | Roesner | B60W 20/40 701/22 |
| 2015/0180395 | A1 * | 6/2015 | Frampton | H02P 9/04 322/14 |
| 2015/0211426 | A1 * | 7/2015 | Remele | F02D 41/0085 123/435 |

FOREIGN PATENT DOCUMENTS

| | | | |
|---|---|---|---|
| DE | 102004011087 | A1 | 11/2005 |
| DE | 102008002152 | A1 | 12/2009 |
| EP | 0964985 | A1 | 12/1999 |

OTHER PUBLICATIONS

International Preliminary Examination Report for related application No. PCT/EP2015/051136, dated May 31, 2016, with English Translation.

PCT International Search Report and Written Opinion of the International Searching Authority dated Mar. 12, 2015 for corresponding PCT/EP2015/051136, with English Translation.

* cited by examiner

OPERATING AN INTERNAL COMBUSTION ENGINE COUPLED TO A GENERATOR

The present patent document is a § 371 nationalization of PCT Application Serial Number PCT/EP2015/051136, filed Jan. 21, 2015, designating the United States, which is hereby incorporated by reference, and this patent document also claims the benefit of EP 14156990.5, filed on Feb. 27, 2014, which is also hereby incorporated by reference.

TECHNICAL FIELD

The embodiments relate to a method for operating an internal combustion engine coupled to a generator. The embodiments also relate to an open-loop and closed-loop control apparatus as a device for carrying out the method.

BACKGROUND

Generators that are driven by an internal combustion engine are known per se. The internal combustion engine may be coupled to an electric generator and a frequency converter may be connected downstream of the generator.

U.S. Patent Publication No. 2009/0194067 A discloses a mobile system having a network-independent energy source in the form of an internal combustion engine and individual assemblies driven by the internal combustion engine, including a generator provided as a current/voltage source. The energy provided by the internal combustion engine and the energy needed by the or each assembly are monitored. If the energy needed exceeds the available energy, a rotational speed target value that is used to control the rotational speed of the internal combustion engine is increased or individual assemblies are deactivated according to a priority scheme, so that either the available energy is increased or the energy requirement is reduced.

DE 10 2004 017 087 A1 discloses an assembly with an internal combustion engine. The assembly having an internal combustion engine is used as a drive source, which is rotationally connected to an energy generator, (e.g., an electrical generator, a hydraulic pump, an air compressor or the like). The internal combustion engine has a rotational speed controller for stabilizing a preselected rotational speed, wherein the rotational speed controller controls a control member of the internal combustion engine in order to vary the amount of fuel supplied to the internal combustion engine up to a full load limit. The assembly also has a unit for measuring the change in load of the energy generator, wherein the unit is operatively connected to the rotational speed controller of the internal combustion engine by a signal link in such a manner that the control member of the internal combustion engine may be actuated by the unit independently of the rotational speed controller.

The trend for arrangements having a generator coupled to an internal combustion engine is moving towards lightweight construction, and therefore, for example, balance weights, as have previously been provided to compensate any fluctuations in rotational speed, are if possible avoided or at least the moved masses are reduced. The generator may be operated at a predefined or predefinable rotational speed. For this purpose, the generator is assigned a rotational speed controller. The internal combustion engine and the combustion process taking place therein are managed by controlling the rotational speed. This may be done according to different criteria. For example, power, efficiency, and emission are conceivable.

Previously, the balance weight on the generator has been increased in order to obtain greater rotational speed stability of the generator. However, such an increase in the moved masses is actually undesirable, especially if the internal combustion engine and the generator are part of a motor vehicle or the like and are moved together from the motor vehicle. As an alternative, the rotational speed control was previously accordingly operated with maximum dynamics in order to achieve a broad range and high closed-loop gains. A possibility in this regard includes the use of very high clock frequencies of the rotational speed controller. However, this may result in excessively increased power losses in the switching elements.

SUMMARY AND DESCRIPTION

The scope of the present invention is defined solely by the appended claims and is not affected to any degree by the statements within this summary. The present embodiments may obviate one or more of the drawbacks or limitations in the related art.

An object of the present embodiments accordingly includes specifying a method for operating an internal combustion engine coupled to a generator and a device operating according to the method, with which the above-outlined disadvantages are avoided or at least reduced in terms of their effects.

To this end, in a method for operating a system including a generator and an internal combustion engine that drives the generator, in which system a rotational speed of the generator is controlled by a rotational speed controller, it is provided that the rotational speed controller outputs a target torque as a manipulated variable and that an additional torque is imposed on the target torque, wherein the additional torque is calculated or determined on the basis of a measured value picked up from the system.

Optimal process management of the system, including the internal combustion engine and the generator, is achieved by imposing an additional torque, that is, a numerical and automatically processable value for the additional torque, on the target torque output by the rotational speed controller as manipulated variable. Balance weights and the like for stabilizing the rotational speed of the generator are then not needed.

An open-loop and closed-loop control apparatus is provided, wherein the apparatus is configured for carrying out the operating method described here and below. The apparatus includes at least one control unit and a rotational speed controller. A target torque may be output as a manipulated variable by the rotational speed controller.

In one embodiment of the method, a counter torque is calculated as the additional torque that is imposed on the target torque output by the rotational speed controller. The counter torque is calculated on the basis of a measured value recorded in the system. The measured value recorded in the system is a measured pressure value recorded at the internal combustion engine, e.g., a measured pressure value that indicates the pressure in the combustion chamber of the internal combustion engine. The counter torque/additional torque is then calculated on the basis of the measured pressure value.

In an alternative embodiment of the method, a counter torque is likewise calculated as the additional torque that is imposed on the target torque output by the rotational speed controller. In this case, however, a measured pressure value that is recorded in the system is not used. Instead, the counter torque/additional torque is calculated by estimating a pressure prevailing in the combustion chamber of the internal combustion engine by a thermodynamic model and calculating the counter torque/additional torque on the basis of the estimated pressure.

In another alternative embodiment of the method, when the additional torque is calculated by a pilot control block, a pilot control torque is calculated, which is imposed as the additional torque on the target torque output by the rotational speed controller.

In a particular embodiment of the method, one of the calculated additional torques and the additional torque output by the pilot control block are used at the same time. Therefore, the additional torque output by the pilot control block and the additional torque determined on the basis of the measured or estimated pressure in the combustion chamber of the internal combustion engine are imposed on the target torque output by the rotational speed controller.

To carry out individual embodiments of the method, the open-loop and closed-loop control apparatus is characterized in that a measured pressure value recorded in the system, (e.g., at the internal combustion engine), may be processed by the open-loop and closed-loop control apparatus, that the additional torque may be determined using the measured pressure value and using data that may be output by the control unit, (e.g., at least one geometric value, a target position, and kinematic data), and that the additional torque may be imposed on the target torque.

A first alternative embodiment of the open-loop and closed-loop control apparatus is intended and designed such that an estimated value of the pressure prevailing in the combustion chamber of the internal combustion engine may be determined by a thermodynamic model included in the open-loop and closed-loop control apparatus. The apparatus is also intended and designed such that the additional torque may be determined using the estimated value and data that may be output by the control unit, (e.g., at least one geometric value, a target position, and kinematic data), and that the additional torque may be imposed on the target torque.

A further alternative embodiment of the open-loop and closed-loop control apparatus is intended and designed such that a pilot control torque may be determined by a pilot control block included in the open-loop and closed-loop control apparatus, and that the pilot control torque may be imposed as the additional torque on the target torque.

One embodiment of the open-loop and closed-loop control apparatus that is intended to carry out the method, in which one of the calculated additional torques and the additional torque output by the pilot control block are used at the same time, is characterized by an implementation of a combination of the above-mentioned corresponding features.

Overall, the embodiments also include a system having a generator and an internal combustion engine and an open-loop and closed-loop control apparatus having the features described here and below.

BRIEF DESCRIPTION OF THE DRAWINGS

An exemplary embodiment is explained in more detail below using the drawings. Objects or elements that correspond to each other are provided with the same reference signs in all the figures.

DETAILED DESCRIPTION

Figure 1:
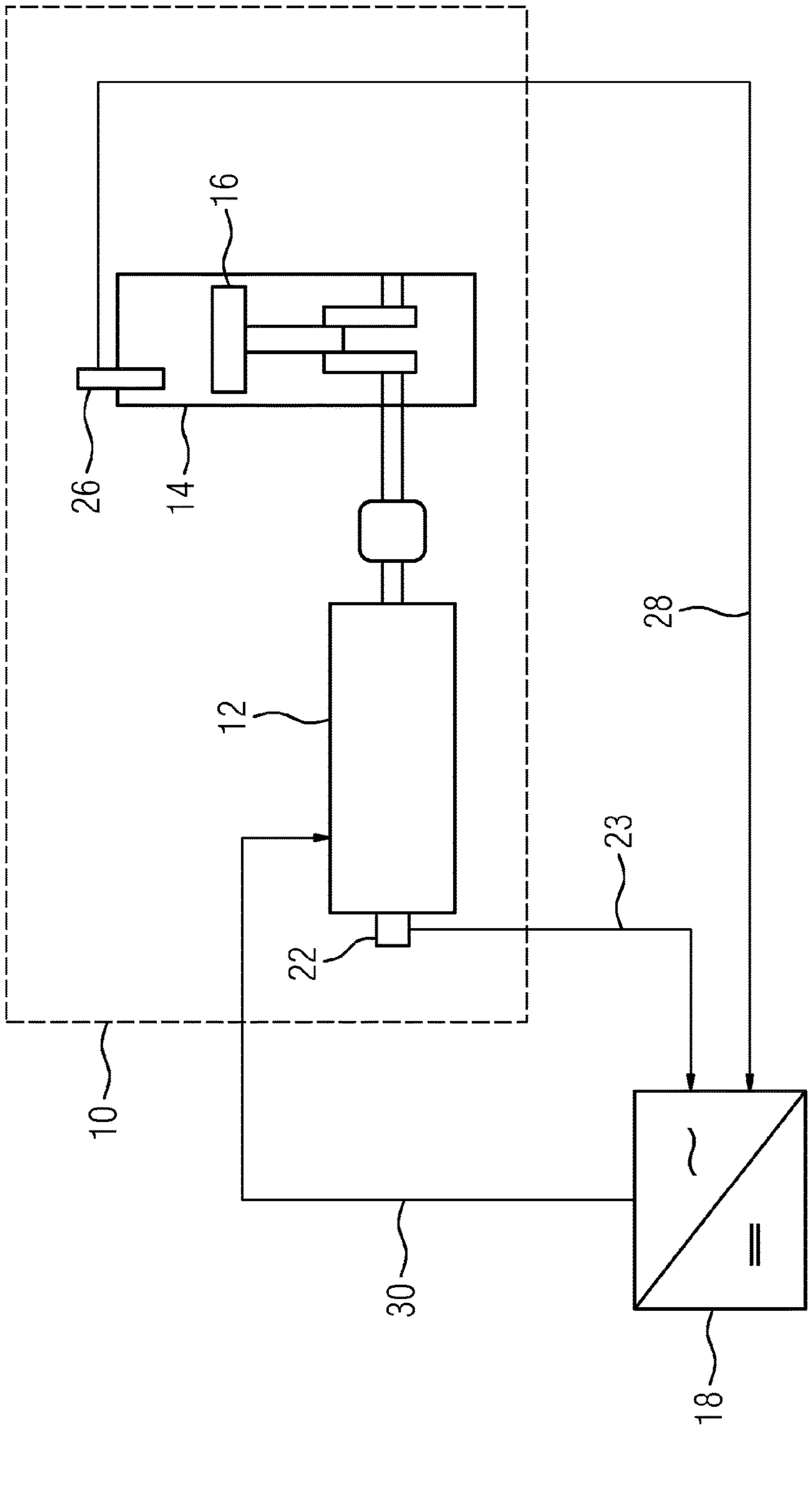
FIG. 1 depicts an example of a system having an internal combustion engine and a generator, wherein the generator is driven by the internal combustion engine.

The diagram in FIG. 1 depicts the basic structure of a system 10 of the type in question here, in a schematically simplified form. The system 10 includes an electric motor operated as a generator 12 and an internal combustion engine 14. The internal combustion engine 14 is mechanically coupled to the generator 12. The diagram of the internal combustion engine 14 depicts the crankshaft and a piston 16 thereof. The internal combustion engine 14 may include more than the one piston 16 depicted, that is, may be in the form of a split-single engine, for example.

The alternating current generated by the generator 12 is supplied to a converter 18 (e.g., frequency converter) depicted here as a rectifier. The energy originally generated by the internal combustion engine 14 may be picked up at the output of the converter 18 in the form of electrical energy.

The system 10 may be considered as a mobile system for use in a motor vehicle, for example. In addition, the system 10 may also be considered as an emergency generating set or the like.

An open-loop and closed-loop control apparatus 20 (FIG. 2) included for example in the converter 18 effects control of the system 10, e.g., rotational speed control of the generator 12. A position sensor 22 is assigned to the generator 12 for this purpose. An actual position value may be obtained during operation by the position sensor 22, and a progression over time of the actual position value is a measure of the respective rotational speed of the generator 12. Therefore, an actual position value 23 and also directly or at least indirectly an actual rotational speed value 24 (FIG. 2) may be obtained from the position sensor 22.

It is also depicted that a pressure sensor 26 is assigned to the internal combustion engine 14. A measured value regarding a pressure (measured pressure value 28) generated during operation of the internal combustion engine 14 in the piston chamber thereof may be obtained by the pressure sensor 26.

The measured pressure value 28 and the actual position value 23 and/or the actual rotational speed value 24 are supplied to the open-loop and closed-loop control apparatus 20. On the basis thereof, a manipulated variable 30 is generated to influence the system 10.

A pressure generated by the combustion taking place in the internal combustion engine 14 and mass forces arising as a result of the movement and acceleration of the piston 16 occur as process forces inside the system 10 subjected to open-loop and closed-loop control. The process forces are known or may be measured, and the approach explained below is based on a linearization of the process forces and subsequent control of the rotational speed and/or pilot control of the process forces and subsequent control of the rotational speed.

The linearization of the process forces is explained first.

Figure 2:
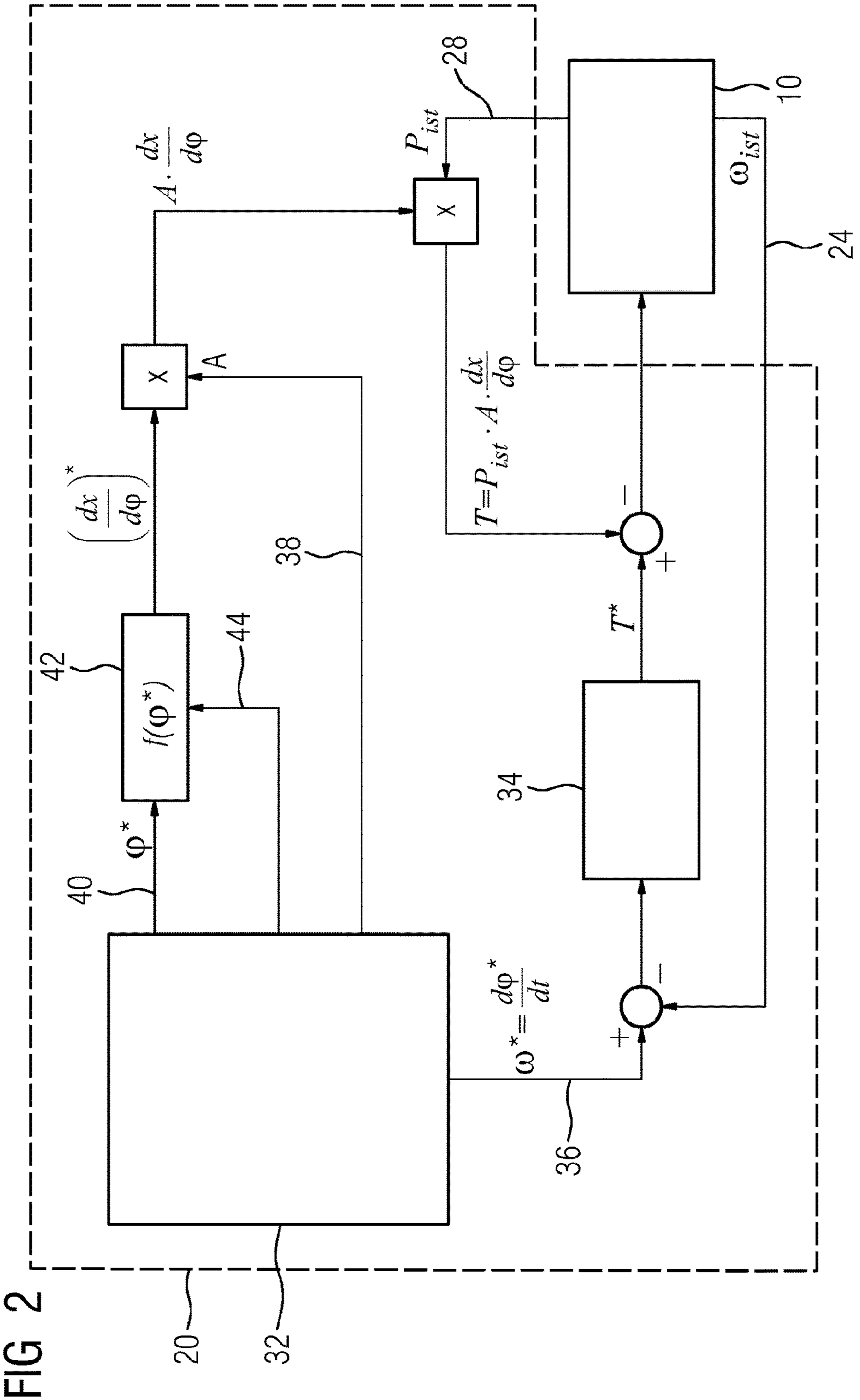
FIG. 2 depicts a first embodiment of an open-loop and closed-loop control apparatus for open-loop and closed-loop control of a system of the type depicted in FIG. 1.

The diagram of FIG. 2 depicts the already mentioned open-loop and closed-loop control apparatus 20 with further details, e.g., a control unit 32 and a rotational speed controller 34 as functional units inside the open-loop and closed-loop control apparatus 20.

The control unit 32 specifies a target rotational speed $\omega^*=d\varphi^*/dt$ 36 (superscript asterisks indicate target values). The target rotational speed $\omega^*$ may be the starting value of a current controller connected upstream of the system 10 overall. The rotational speed controller 34 outputs a target torque T* as a manipulated variable 30. For linearization, the torque that the generator 12 applies counter to the pressure prevailing in each case in the combustion chamber is subtracted from the target torque T* at a summation point downstream of the rotational speed controller 34.

On the basis of the measured pressure value $P_{ist}$ 28, the force currently acting on the generator 12 in each case may be calculated, since the resulting force, as is known, is calculated in the form of a product of the pressure respectively prevailing in the combustion chamber and the area A of the piston 16. An automatically processable value for the area A of the piston 16 is output by the control unit 32 on the basis of a respectively predefined or predefinable parameterization as a geometric value 38.

With the actual position value 23 recorded by the position sensor 22, the current position φ (e.g., rotational position) of the rotor of the generator 12 is known. Moreover, a respective target position φ* 40 and an angle-dependent transmission ratio between the rotational position of the rotor and the translational position x of the piston 16 are known at all times. The open-loop and closed-loop control apparatus 20 in this respect includes a transfer member 42, which outputs a measure for the change in the translational position of the piston 16 depending on the change in the rotational position of the rotor $(dx/d\varphi)^*$ on the basis of the target position φ* 40. The transfer function f(φ*) of the transfer member 42 may be influenced by kinematic data 44 that may be output by the control unit 32. The kinematic data 44 output in each case are likewise based on a predefined or predefinable parameterization of the open-loop and closed-loop control apparatus 20.

The torque that the generator 12 applies counter to the pressure prevailing in the combustion chamber (counter torque T) may be calculated from the above-mentioned variables as the additional torque T that is imposed on the target torque T* output by the rotational speed controller 34. The counter torque then results as:

$$T = P_{ist} \cdot A \cdot \frac{dx}{d\varphi}.$$

The pressure measurement included in the determination of the counter torque T in the form of the measured pressure value $P_{ist}$ 28 recorded in the system 10 is a feedback of the pressure and represents a linearization of the system 10 overall.

Figure 3:
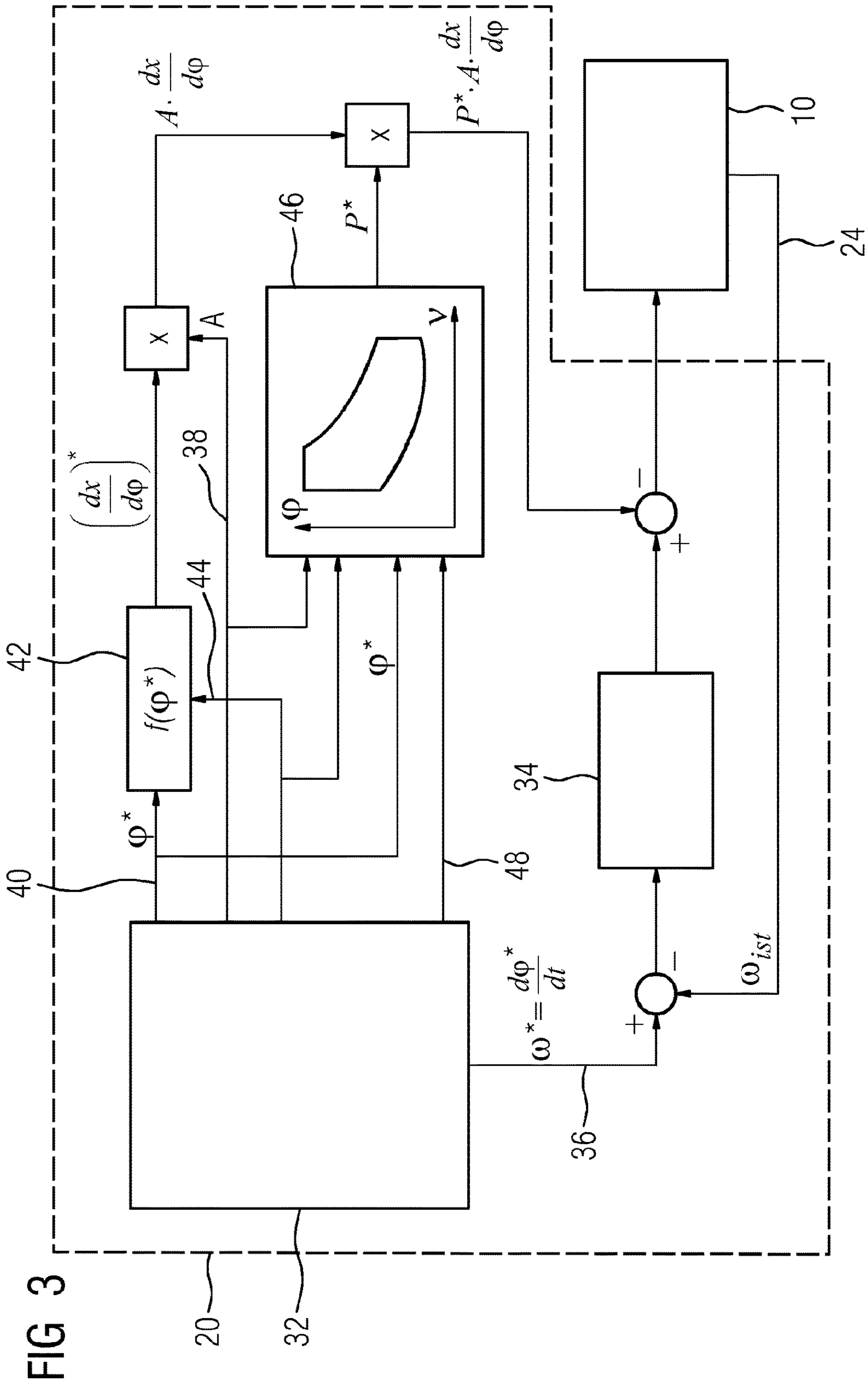
FIG. 3 depicts a second embodiment of an open-loop and closed-loop control apparatus for open-loop and closed-loop control of a system of the type depicted in FIG. 1.

The diagram of FIG. 3 shows that, instead of a pressure measurement, a determination of the pressure may take place by calculation, e.g., by estimating the pressure prevailing in the combustion chamber of the internal combustion engine 14 using a thermodynamic model 46. Values input into the thermodynamic model 46 are, in addition to the current position φ (e.g., actual position value 23) or the respective target position φ* 40 of the rotor of the generator 12, the geometric value 38, or other geometric data, the kinematic data 44 and thermodynamic data 48, (e.g., information on the amount of fuel injected in each case into the combustion chamber of the internal combustion engine 14). A target value or an estimated value P* for the pressure in the combustion chamber of the internal combustion engine 14 is produced at the output of the thermodynamic model 46. The counter torque T may be calculated, as above:

$$T = P^* \cdot A \cdot \frac{dx}{d\varphi}.$$

Figure 4:
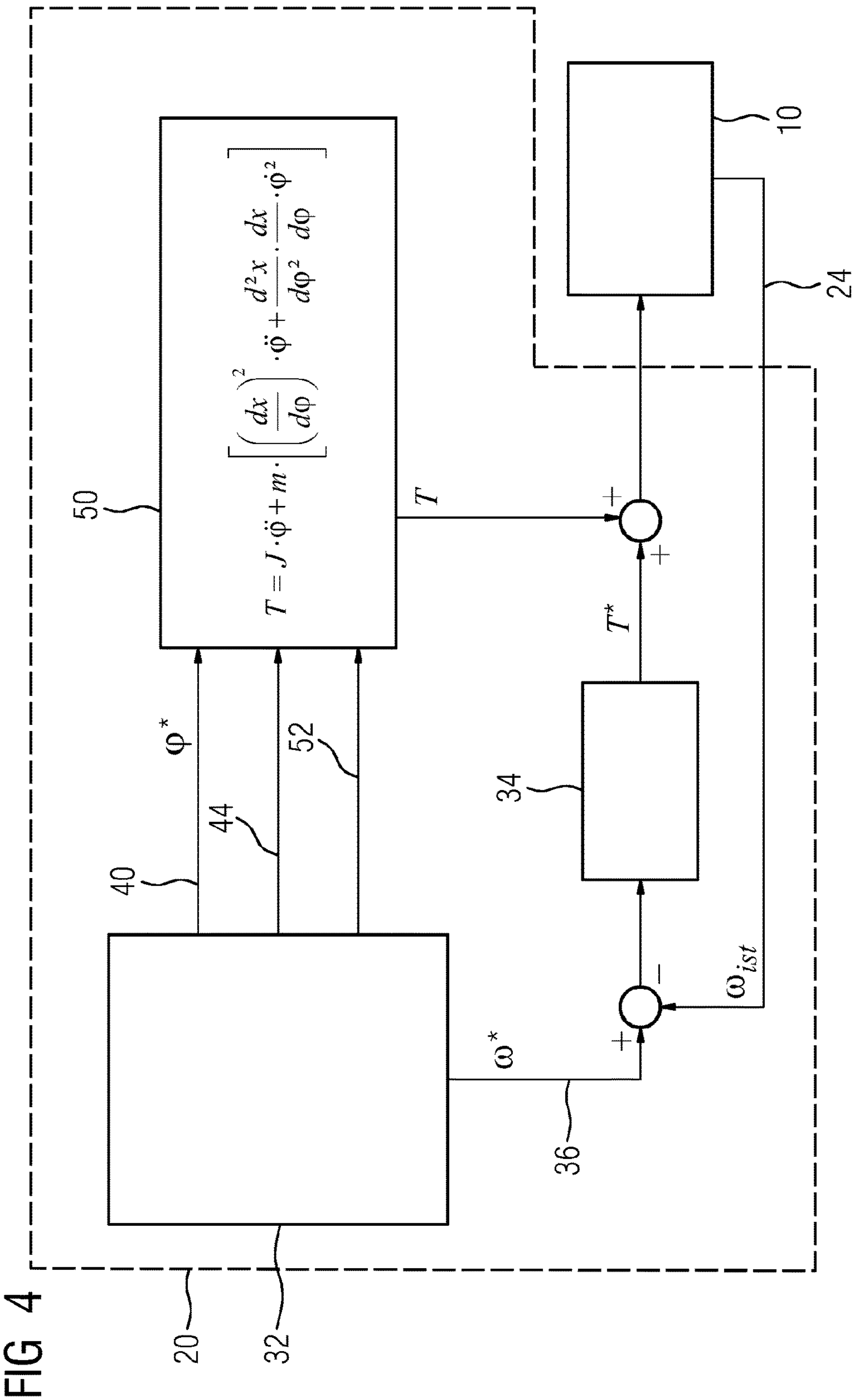
FIG. 4 depicts a third embodiment of an open-loop and closed-loop control apparatus for open-loop and closed-loop control of a system of the type depicted in FIG. 1.

The diagram of FIG. 4 depicts a pilot control of the process forces, which may be used additionally or alternatively to the linearization (FIG. 2, FIG. 3).

The pilot control is based on the fact that the mass force of the piston 16 may be calculated, specifically from the target position φ* 40 (e.g., or the actual position value φ 23) and the angle-dependent transmission ratio between the rotational position of the rotor and the position x of the piston 16. A respectively current angular acceleration at the rotor is also known. The additional torque T (e.g., pilot control torque), which is necessary to accelerate rotor and piston 16 and is imposed on the target torque T* output by the rotational speed controller 34, is calculated by a pilot control block 50, which is included in the open-loop and closed-loop control apparatus 20, to give:

$$T = J \cdot \ddot{\varphi} + m \cdot \left[\left(\frac{dx}{d\varphi}\right)^2 \cdot \ddot{\varphi} + \frac{d^2x}{d\varphi^2} \cdot \frac{dx}{d\varphi} \cdot \dot{\varphi}^2\right].$$

This variant automatically (implicitly) takes into account predefined rotational speed fluctuations by optimal process management. The pilot control block 50 includes an implementation of the above-specified relationship to determine the pilot control torque T. Values input into the pilot control block 50 and output by the control unit 32 are the respective target position φ* 40 (e.g., or the actual position value φ 23), kinematic data 44, and at least one item of mass information m 52 relating to the moved masses. This produces precise pilot control of the necessary accelerations and of the torque to be applied in each case.

The embodiment of the open-loop and closed-loop control apparatus 20 depicted in FIG. 4 is independent of the embodiments depicted in FIG. 2 and FIG. 3. However, the embodiments described may also be combined, for example, in the form of a combination of the embodiments of FIG. 2 and FIG. 4 or a combination of the embodiments of FIG. 3 and FIG. 4.

The advantage of an open-loop and closed-loop control apparatus 20 of the type described here includes that the rotational speed controller 34 is relieved by the direct control of the process forces, since interfering forces that are otherwise taken into account by the rotational speed controller 34 may be eliminated. The rotational speed controller 34 is thus only responsible for implementation of process management on the basis of the target rotational speed ω* 36 specified by the control unit 32. If the pilot control according to FIG. 4 is used in addition to the linearization (FIG. 2, FIG. 3), the process management is carried out by the pilot control and the rotational speed controller 34 only has to adjust small deviations.

Overall, the counter force exerted on the generator 12 by the internal combustion engine 14 is implemented in a more dynamic and direct manner, because it depends only on the very large dynamics of the current controller on the input side.

Balance weights may be omitted without reducing the stability of the rotational speed. This results in a more lightweight design and a smaller amount of current necessary to accelerate and decelerate the moved masses.

Although the invention has been illustrated and described in detail using the exemplary embodiment, the invention is not restricted by the disclosed example(s), and other variations may be derived therefrom by a person skilled in the art without departing from the scope of protection of the invention.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for operating a system comprising a generator and an internal combustion engine that drives the generator, the method comprising:

controlling a rotational speed of the generator by a rotational speed controller;

outputting, by the rotational speed controller, a target torque as a manipulated variable; and imposing an additional torque on the target torque, wherein the additional torque is a torque that the generator applies counter to a pressure prevailing in a combustion chamber of the internal combustion engine, wherein the pressure prevailing in the combustion chamber of the internal combustion engine is estimated by a thermodynamic model, and wherein the additional torque is calculated based on the estimated pressure.

2. The method of claim 1, wherein the additional torque is also a torque to accelerate the rotor and the piston, wherein the additional torque is calculated by a pilot control block, such that a pilot control torque is calculated and is imposed as the additional torque on the target torque output by the rotational speed controller.

3. The method of claim 2, wherein the additional torque determined on the basis of the estimated pressure is also imposed on the target torque output by the rotational speed controller.

4. An open-loop and closed-loop control apparatus comprising:

at least one control unit; and a rotational speed controller, wherein the apparatus is configured to control a rotational speed of a generator of a system, wherein a target torque is configured to be output as a manipulated variable by the rotational speed controller, wherein the apparatus is configured to impose an additional torque on the target torque to counter a pressure prevailing in a combustion chamber of the internal combustion engine, wherein an estimated value of the pressure prevailing in the combustion chamber of the internal combustion engine is configured to be calculated by a thermodynamic model, and wherein the additional torque is configured to be calculated based on the estimated value and data output by the control unit.

5. The open-loop and closed-loop control apparatus of claim 4, wherein a pilot control torque is configured to be determined by a pilot control block included in the open-loop and closed-loop control apparatus, and wherein the pilot control torque is configured to be imposed as the additional torque on the target torque.

6. A system comprising:

a generator;

an internal combustion engine; and an open-loop and closed-loop control apparatus having:

at least one control unit; and a rotational speed controller, wherein the open-loop and closed-loop control apparatus is configured to control a rotational speed of the generator of the system, wherein a target torque is configured to be output as a manipulated variable by the rotational speed controller, and wherein the open-loop and closed-loop control apparatus is configured to impose an additional torque on the target torque to counter a pressure prevailing in a combustion chamber of the internal combustion engine, wherein the pressure prevailing in the combustion chamber of the internal combustion engine is configured to be estimated by a thermodynamic model, wherein the additional torque is configured to be calculated based on the estimated pressure.

7. The open-loop and closed-loop control apparatus of claim 4, wherein the data output by the control unit comprises at least one geometric value, a target position, and kinematic data.

* * * * *